Aug. 26, 1958

J. W. WRIGHT 2,849,037

RECIPROCATING SAW BLADE

Filed Dec. 9, 1954

INVENTOR.
JOHN W. WRIGHT

BY

Campbell, Brumbaugh, Free & Graves
his ATTORNEYS.

United States Patent Office 2,849,037
Patented Aug. 26, 1958

2,849,037
RECIPROCATING SAW BLADE
John W. Wright, Stratford, Conn.
Application December 9, 1954, Serial No. 474,173
5 Claims. (Cl. 143—133)

This invention relates to reciprocating saw blades, and has particular reference to formed teeth on such blades designed for use in short stroke power saws.

Certain difficulties encountered in the development of an effective high speed reciprocating power saw, such as disclosed in my copending application Serial No. 450,883, filed August 19, 1954, are concerned with the teeth employed on the saw blade. With such a reciprocating power saw, it is necessary to employ a very short stroke making it impractical for more than one saw tooth to pass over the same point in the kerf. However, the saw teeth found in conventional circular, chain, buck, hand and stationary drag saws or the like are designed specifically for the purpose of operating in sequence. It will be understood that since only one tooth passes over one portion of the kerf, each tooth must be designed to work independently of the others.

In addition to the above requirements, the saw teeth employed in a short stroke reciprocating power saw must, since the length of the stroke is almost always less than the cross section of the wood to be cut, incorporate some provision for progressively moving the sawdust out of the kerf. In addition, the weight of the saw blade must be minimized in view of the dynamic forces attributable to the high speed action of the saw. Such high speed action also requires that the tooth and blade friction be reduced to a minimum value to preclude any unnecessary heating and power losses.

Another requirement that must be met in the saw teeth found in a reciprocating power saw, and particularly those of the portable type concerns resharpening of such teeth. Such an operation must be readily accomplished without the special training and equipment ordinarily needed for this process. Accordingly, it is an object of the present invention to provide a reciprocating saw blade which will provide an effective cutting action when operated through short strokes at high speeds.

It is another object of the present invention to provide a saw blade having the above characteristics in which the teeth efficiently remove sawdust from the kerf.

It is yet a further object of the invention to provide a saw blade having the above characteristics which may be quickly and easily resharpened without utilizing special tools or other equipment.

These and further objects and advantages of the present invention will be more readily understood when the following description is read in connection with the accompanying drawings in which.

Figure 1:
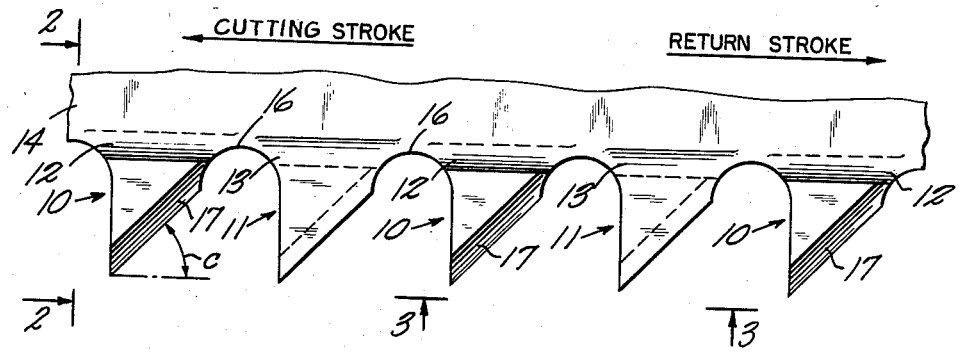
Figure 1 is a side elevation of a portion of a saw blade having teeth formed thereon in accordance with the principles of the present invention.
Figure 2:
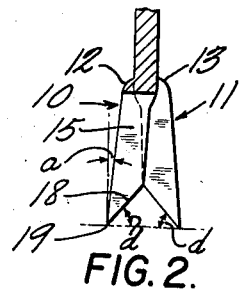
Figure 2 is a transverse section of the blade shown in Figure 1 taken on the view line 2—2 looking in the direction of the arrows.
Figure 3:
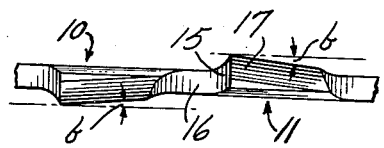
Figure 3 is a bottom view of a portion of the blade shown in Figure 1 taken on the view line 3—3 looking in the direction of the arrows.

Referring to an illustrative embodiment of the invention with particular reference to Figures 1 to 3, inclusive, identically formed saw teeth 10 and 11 are joined in laterally offset relation by roots 12 and 13, respectively, to a blade body 14. As clearly shown in Figure 3, the adjacent teeth 10 and 11 are offset to opposite sides of the blade 14.

Considering one of the teeth 10 in detail, it comprises a vertical leading face 15 approximately perpendicular to the axis of the blade body 14 and terminating in a gullet 16 extending between adjacent teeth. An angle or beveled face 17, also terminating at the gullet 16, extends towards the blade body 14 and away from the vertical face 15 to form a cutting edge 18 and a cutting point 19.

Examining the lateral offset of the tooth 10 from the blade 14 in detail, the point 19 is slightly more offset than the root 13 to form an upward relief angle $a$, shown in Figure 2. This permits a slight clearance between the side of the tooth 10 and the side of the kerf, above the cutting point 19, to reduce frictional forces when the blade 14 reciprocates.

In addition, the vertical face 15 is offset slightly more than the angle face 17 to provide a slight rearward relief angle $b$ which, obviously, results in a slight clearance behind the cutting point 19. Both the upward relief angle $a$ and the rearward relief angle $b$ are very small, preferably on the order of 2 degrees.

The angle face 17 forms a bottom clearance angle $c$ with a horizontal plane and is greater than such angles normally provided for in saw teeth. Preferably, the angle $c$ is on the order of 45 degrees. This permits, as will be explained in detail below, the points 19 to remain in the bottom of the kerf during the return stroke of the blade 14.

The angle face 17 is beveled to form an angle $d$, which is considerably larger than bevel angles normally employed in saw teeth. This allows the teeth 10 and 11 to penetrate the fibers at the bottom of the kerf while precluding excessive packing of sawdust below the angle face 17. Preferably, the bevel angle $d$ is on the order of 45 to 50 degrees.

Considering the operation of the saw teeth 10 and 11 formed on the saw blade 14, preferably the stroke of the saw blade 14 is determined by the distance between the points 19 found on consecutive teeth 10 on one side of the blade 14, adjacent teeth being laterally offset in opposite directions and spaced substantially one-half of the predetermined stroke from each other. Accordingly, it will be apparent that each of the teeth 10 and 11 operates substantially independently rather than sequentially as in conventional saw blades.

Examining first the cutting stroke of the blade 14 as indicated in Figure 1, the cutting edge 18 and point 19 will sever the fibers in the bottom of the kerf smoothly and efficiently. The size of the relief angles $a$ and $b$ contributes greatly to this action since it does not permit the teeth 10 and 11 to grab the sides of the kerf. It should also be noted that due to the present structure, the teeth 10 and 11 may be precision set during manufacture, as distinguished from conventional teeth which must be reset by hand after each filing. This results in the exact balancing of the forces on the teeth 10 and 11.

In resharpening a saw blade provided with teeth formed according to this embodiment of the invention, it is only necessary to draw a file at right angles across the vertical face 15 to remove sufficient metal to sharpen the edge 18 and point 19. In this connection, it will also be seen that whereas jointing, which comprises leveling the tips of the teeth before sharpening, is ordinarily required in order to have the teeth of a conventional saw blade work properly in sequence, this operation may be omitted in this resharpening process since as set forth above, each tooth operates independently of the following tooth.

As mentioned above, the formed tooth construction of the invention permits permanent setting of the teeth 10 and 11. Thus, the relief angles $a$ and $b$ are constant and remain so regardless of the amount of metal removed during the filing operation. In addition, the amount of offset along the roots 12 and 13 of the teeth 10 and 11 is adequate to insure ample clearance at all times for the saw blade 14 in the kerf.

Further considering the cutting action of the teeth 10 and 11 on their cutting stroke, it will be apparent that the amount of offset cannot be greater than one-half the thickness of the saw blade 14 or the saw teeth 10 and 11. Obviously, any greater offset will result in lateral spacing between the inner ends of the cutting edges 18 and consequently, wood will not be removed therefrom. Of course, if the offset is substantially less than one-half the thickness of the tooth or blade, there will be inadequate space for sawdust to pass between the inner surfaces of the teeth 10 and 11 and the opposite sides of the kerf.

During operation of the blade 14, the sawdust produced by the cutting action of the teeth 10 and 11 must be removed from the kerf to prevent jamming and ineffective cutting. The accumulation of sawdust in the kerf has, in the past, provided one of the most serious problems in connection with reciprocating power saws. The present saw tooth construction results in a progressive movement of the sawdust out of the kerf. In addition, the configuration of the teeth 10 and 11 precludes sawdust interference with their cutting function. In particular, on the cutting stroke, the vertical face 15 encounters and advances the sawdust. It should be understood that this action occurs at very high speeds, for example, 160 strokes per second, so that the sawdust in the kerf is progressively and rapidly moved out of the forward end of the kerf.

Examining next the return stroke of the blade 14, the provision of the large bevel angle $a$ results in the sawdust being wedged by the angle face 17 over to the opposite side of the kerf. This permits the teeth 10 and 11 to bypass the sawdust so that the point 19 may penetrate and score the fibers at the bottom of the kerf. In the event the bevel angle $a$ is too small, the sawdust will pile up below the angle face 17 and wedge the tooth 10 upwardly away from the bottom of the kerf. On the other hand, if the bevel angle $a$ is too large, the point 19 of the tooth 10 will be so weakened that it will become dull in only a short period of use.

The clearance angle $c$ must also be considered in the return stroke of the blade 14. If it is substantially less than 45 degrees, the tooth 10 will not bypass sawdust readily on this stroke, an important factor to be considered if the sawdust is to be progressively moved out of the kerf. On the other hand, if the clearance angle $c$ is substantially greater than 45 degrees, the point 19 will be weakened and not hold its sharpness for any substantial period of time.

Figure 4:
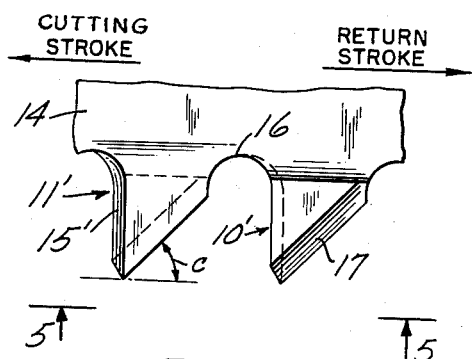
Figure 4 is a side elevation of a portion of a saw blade, similar to that shown in Figure 1, in which the teeth are modified in accordance with the present invention.
Figure 5:
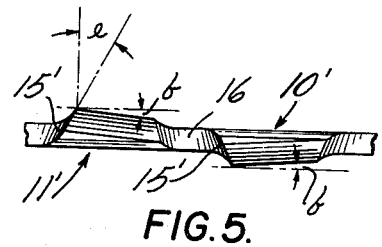
Figure 5 is a bottom view of the portion of the saw blade illustrated in Figure 4.

Turning to a modified form of the invention illustrated in Figures 4 and 5 in which elements similar to those found in Figure 1 will be designated by like reference characters, the blade 14 carries teeth 10' and 11' similar in most respects to the teeth 10 and 11 described in connection with Figure 1. However, in this embodiment of the invention, a vertical face 15' on the tooth 10' is formed with a shear angle $e$ so that it faces outwardly. From Figure 5, it will be evident that on the cutting stroke of the blade 14, the face 15' will pocket sawdust against the side of the kerf, this action facilitating the advance of the sawdust. It should be noted that it is not permissible to provide a bevel angle on the vertical face 15' causing it to face inwardly since this would tend to force and bypass sawdust to the middle of the kerf during the cutting stroke. Preferably, the shear angle $e$ is not large and may, for example, be on the order of 25 to 30 degrees.

The formed tooth construction of the present invention greatly facilitates cutting by means of short stroke reciprocating power saws. These teeth cut smoothly through wood and similar material, and jamming by the generated sawdust is precluded through progressive movement of such sawdust out one end of the kerf. In addition, the construction of the saw blade permits the resharpening operation to be accomplished with a simple file and without specialized experience or training.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. A reciprocating saw blade comprising a plurality of saw teeth extending from a blade body and spaced along an edge thereof, a laterally offset root joining each tooth in a laterally offset relation to the blade, adjacent teeth being laterally offset in opposite directions, a vertical leading face formed on each tooth approximately perpendicular to the longitudinal axis of the blade, the vertical leading face of each tooth forming with the plane of the blade in the offset direction of said tooth an angle of at least 90 degrees to advance sawdust in one direction along a kerf being cut during a cutting stroke of the blade, a beveled face extending towards the blade body and away from the leading face to form a cutting edge and point on each tooth, the bevel of the beveled face extending towards the blade body and inwardly from the cutting point, the beveled face of each tooth forming with the plane of the blade in the offset direction of said tooth an acute angle to bypass sawdust by urging it towards the side of the kerf remote from said tooth during a return stroke of the blades, the lateral offset of the leading face being greater than that of the beveled face, and the lateral offset of the cutting point being greater than that of the root, whereby reciprocation of the saw blade in the kerf progressively moves sawdust along the kerf in one direction.

2. A saw blade as defined in claim 1, wherein the vertical leading face is approximately perpendicular to the plane of the blade.

3. A sawblade as defined in claim 1, wherein the vertical leading face on each tooth is angled outwardly to form with the plane of the blade in the offset direction of said tooth an angle in excess of 90 degrees to pocket sawdust against the side of the kerf contiguous to said tooth and advance the sawdust in one direction along said kerf.

4. A saw blade as defined in claim 1, wherein the bevel angle is approximately 50 degrees and the angle of the beveled face with the bottom of the kerf is approximately 45 degrees.

5. A reciprocating saw blade adapted to be moved through a predetermined stroke comprising a plurality of saw teeth extending from a blade body and spaced along an edge thereof, a laterally offset root joining each tooth in a laterally offset relation to the blade, adjacent teeth being laterally offset in opposite directions and spaced substantially one-half of the predetermined stroke from each other, a leading face formed on each tooth approximately perpendicular to the longitudinal axis of the blade, the leading face of each tooth forming with the plane of the blade in the offset direction of said tooth an angle of at least 90 degrees to advance sawdust in one direction along a kerf being cut during a cutting stroke of the blade, a beveled face extending toward the blade body and away from the leading face to form a cutting edge and point on each tooth, the bevel of the beveled face extending towards the blade body and inwardly from the cutting point, and the beveled face of each tooth forming with the plane of the blade in the offset direction of said tooth an acute angle to bypass sawdust by urging it towards the side of the kerf remote from said tooth during a return stroke of the blade, whereby reciprocation of the saw blade in the kerf progressively moves sawdust along the kerf in one direction.

References Cited in the file of this patent

UNITED STATES PATENTS

| | | |
|---|---|---|
| 813,371 | Fleming | Feb. 20, 1906 |
| 848,842 | McKam | Apr. 2, 1907 |
| 1,649,864 | Sherman | Nov. 22, 1927 |
| 2,120,963 | Biro | June 21, 1938 |
| 2,351,737 | Blum | June 20, 1944 |
| 2,603,251 | Christenson | July 15, 1952 |
| 2,703,593 | Weller | Mar. 8, 1955 |